US007570090B2

(12) United States Patent  (10) Patent No.: US 7,570,090 B2
Du  (45) Date of Patent: Aug. 4, 2009

(54) FAST POWER-ON DETECT CIRCUIT WITH ACCURATE TRIP-POINTS

(75) Inventor: Xiao Hong Du, Colorado Springs, CO (US)

(73) Assignee: Ramtron International Corporation, Colorado Springs, CO (US)

( * ) Notice: Subject to any disclaimer, the term of this patent is extended or adjusted under 35 U.S.C. 154(b) by 50 days.

(21) Appl. No.: 11/929,326

(22) Filed: Oct. 30, 2007

(65) Prior Publication Data

US 2009/0108887 A1    Apr. 30, 2009

(51) Int. Cl.
    H03L 7/00    (2006.01)
(52) U.S. Cl. ................. 327/143; 327/198; 327/539
(58) Field of Classification Search .......... 327/143, 327/198, 539
    See application file for complete search history.

(56) References Cited

U.S. PATENT DOCUMENTS

| 5,070,295 | A | | 12/1991 | Morigami |
| 5,440,254 | A | * | 8/1995 | Sundby ................ 327/79 |
| 5,867,047 | A | * | 2/1999 | Kraus ................. 327/143 |
| 6,744,291 | B2 | | 6/2004 | Payne et al. |
| 6,847,240 | B1 | * | 1/2005 | Zhou ................. 327/143 |
| 6,972,602 | B2 | | 12/2005 | Akamatsu |

FOREIGN PATENT DOCUMENTS

JP    5-226995    *    9/1993

OTHER PUBLICATIONS

Ramtron; "Preliminary FM1105 Nonvolatile 5V Dual State Saver"; Ramtron International Corporation; Rev. 1.0; May 2007; pp. 1-8; Colorado Springs, CO US.
Ramtron; "FM1106 Nonvolatile 3V Dual State Saver"; Ramtron International Corporation; Rev. 1.0; May 2007; pp. 1-8; Colorado Springs, CO US.
Ramtron; "FM1107 Nonvolatile 3V Dual State Saver"; Ramtron International Corporation; Rev. 1.0; May 2007; pp. 1-8; Colorado Springs, CO US.
Ramtron; "Preliminary FM1110 Nonvolatile 5V Quad State Saver"; Ramtron International Corporation; Rev. 1.0; Aug. 2007; pp. 1-8; Colorado Springs, CO US.
Ramtron; "FM1112 Nonvolatile 3V Quad State Saver"; Ramtron International Corporation; Rev. 1.0; Aug. 2007; pp. 1-8; Colorado Springs, CO US.
Ramtron; "FM1114 Nonvolatile 3V Quad State Saver"; Ramtron International Corporation; Rev. 1.0; Aug. 2007; pp. 1-8; Colorado Springs, CO US.

* cited by examiner

Primary Examiner—Kenneth B. Wells
(74) Attorney, Agent, or Firm—Hogan & Hartson LLP

(57) ABSTRACT

A power-on reset circuit includes a first PNP transistor having an emitter, a base, and a collector coupled to ground; a second PNP transistor having an emitter coupled to the base of the first transistor, and a base and collector coupled to ground; a third PNP transistor having an emitter, a base coupled to the base of the first transistor, and a collector coupled to ground; a first resistor coupled between VDD and an internal node; a second resistor coupled between VDD and the emitter of the first transistor; a third resistor coupled between the internal node and the emitter of the third transistor; and a comparator having a first input coupled to the internal node and a second input coupled to the emitter of the first transistor for generating a power-on reset signal.

20 Claims, 4 Drawing Sheets

FAST POWER-ON DETECT CIRCUIT WITH ACCURATE TRIP-POINTS

BACKGROUND OF THE INVENTION

The present invention is related to power-on detect circuits, and more particularly, to a fast power-on detect circuit suitable for use in nonvolatile memory and other integrated circuits.

There are accurate power detectors based on the bandgap reference, but they are slow because of the slow response of the operational amplifiers inside the bandgap reference. Thus, this kind of power detector cannot meet most speed requirements. There are timing based power detectors based on RC delay or based on CMOS threshold voltage, but they are very poor in the accuracy of the trip-points. Trying to combine these types of power detectors to achieve both high speed and high accuracy is difficult and unreliable because that involves coordinating between voltage levels and power-up and power-down speeds, and the power-up and power-down profiles are essentially uncertain in the real world.

Power-on detect or power-on reset circuits are used to reset a system to a predetermined state at power-up and power-down. Having a reliable power-on reset circuit is critically important if an incorrect initial state of the circuit in a non-volatile memory may accidentally cause an access to the memory at a low supply voltage and result in data loss. Thus, the power-on reset circuit must reliably reset the circuit and block any access to the memory when the supply voltage is lower than the minimal safe level and release the gate for access when the supply is high enough. Therefore, a reliable power-on reset circuit with a small variation on its trip-point across the process and temperature corners is always desired for this kind of application.

There are basically three types of power-on reset circuits: RC-based, CMOS-threshold-based, and bandgap-based power-on reset circuits. The first two types have fast responses, but large variations on the trip-points across temperature and process corners. In contrast to the first two types of power-on reset circuits, the bandgap-based power-on reset circuits have narrow variations, but their responses are slow and cannot meet the speed requirements for most integrated circuit applications. Attempting to combine these various types of power detectors to achieve both high speed and high accuracy is difficult and unreliable because that involves coordinating voltage levels and power-up and power-down speeds, and the power-up and power-down profiles are essentially uncertain in the real world.

Referring now to FIG. 1, a prior art bandgap-based power-on reset circuit 100 is shown therein. Bandgap reference block 102 generates a reference voltage Vref. Vref is compared with a voltage V0, which is proportional to power supply VDD and is obtained by scaling down VDD through a resistor divider Ra/Rb. The output PORB of the comparator 104 is a logic zero when V0 is lower than Vref and is a logic one (in this case VDD) otherwise.

A typical bandgap reference block 200 is shown in FIG. 2. Resistors R1, R2, and R3, and PNP transistors Q1, Q2, and Q3 form a temperature compensation structure known in the art. Operational amplifier 204 forces input voltages V1 and V2 to be equal by adjusting the output voltage Vref. When the sizes of the resistors R1, R2, and R3, and PNP transistors Q1, Q2, and Q3 are appropriately selected, the output Vref is equal to two times the silicon bandgap voltage and has a zero temperature coefficient at a desired temperature point. In other words, Vref is equal to two times the bandgap voltage when V1 is equal to V2, which is realized by using operational amplifier 204. As mentioned above, the long settling time of the operational amplifier limits the power-up speed. Thus, power-on reset circuits such as circuit 200 are best suited for use in slow power-up and slow power-down applications. These kinds of circuits have good temperature compensation and provide accurate trip-points, but they are not applicable for fast power-up due to long settle time of the operational amplifiers.

What is desired, therefore, is a power-on reset circuit that overcomes the limitations of the prior art and is suitable for use in fast response applications, yet maintains an accurate trip-point.

SUMMARY OF THE INVENTION

According to the present invention, a power-on detect circuit (power detector) has an accurate trip-point and very narrow variation across the process and temperature corners. The trip-point of the power detector has the accuracy of the bandgap reference voltage. The power detector has a fast response that allows users power-up and power-down the circuit quickly. The trip-points are determined solely by the voltage level of the power supply; thus, it reliably trips the circuit independently from the power-up and power-down speeds.

A first embodiment of the power-on reset circuit of the present invention includes a first PNP transistor having an emitter, a base, and a collector coupled to ground; a second PNP transistor having an emitter coupled to the base of the first transistor, and a base and collector coupled to ground; a third PNP transistor having an emitter, a base coupled to the base of the first transistor, and a collector coupled to ground; a first resistor coupled between the VDD power supply and an internal node; a second resistor coupled between VDD and the emitter of the first transistor; a third resistor coupled between the internal node and the emitter of the third transistor; and a comparator having a first input coupled to the internal node and a second input coupled to the emitter of the first transistor for generating a power-on reset signal.

A second embodiment of the power-on reset circuit of the present invention includes a first NPN transistor having an emitter, a base, and a collector coupled to VDD; a second NPN transistor having an emitter coupled to the base of the first transistor, and a base and collector coupled to VDD; a third NPN transistor having an emitter, a base coupled to the base of the first transistor, and a collector coupled to VDD; a first resistor coupled between ground and an internal node; a second resistor coupled between ground and the emitter of the first transistor; a third resistor coupled between the internal node and the emitter of the third transistor; and a comparator having a first input coupled to the internal node and a second input coupled to the emitter of the first transistor for generating a power-on reset signal.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
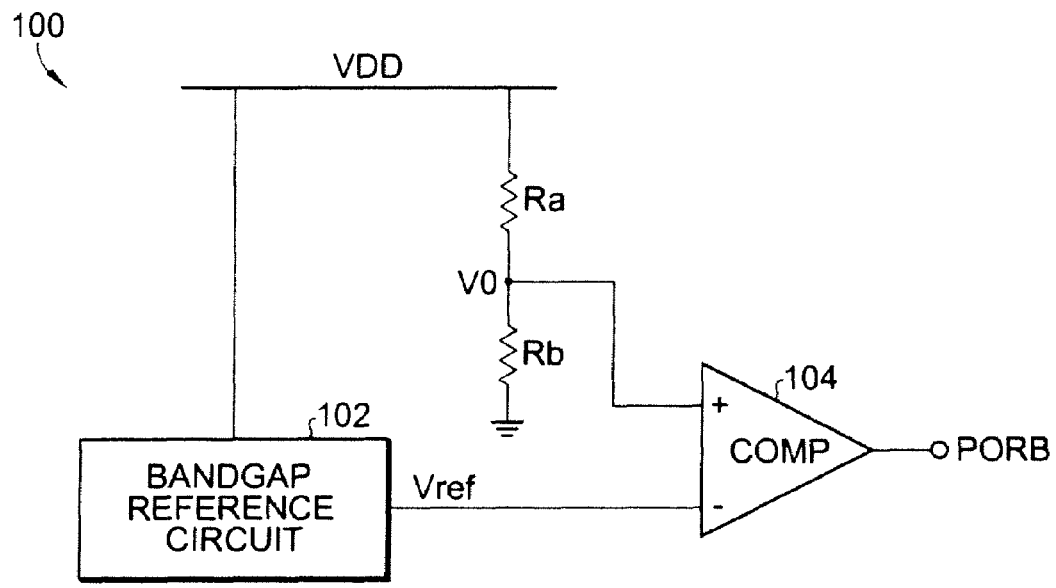
FIG. 1 is a schematic of a bandgap-based power-on reset circuit according to the prior art.
Figure 2:
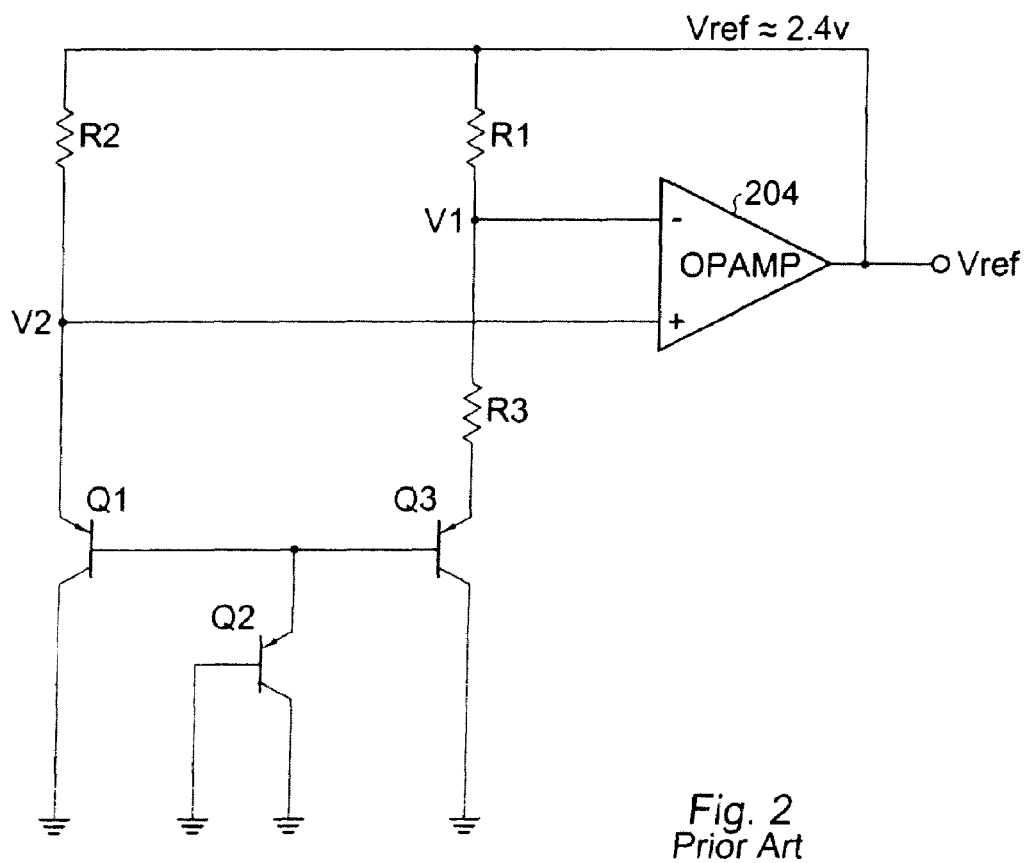
FIG. 2 is a schematic diagram of a bandgap reference circuit according to the prior art for generating a reference voltage of about 2.4 volts.
Figure 3A:
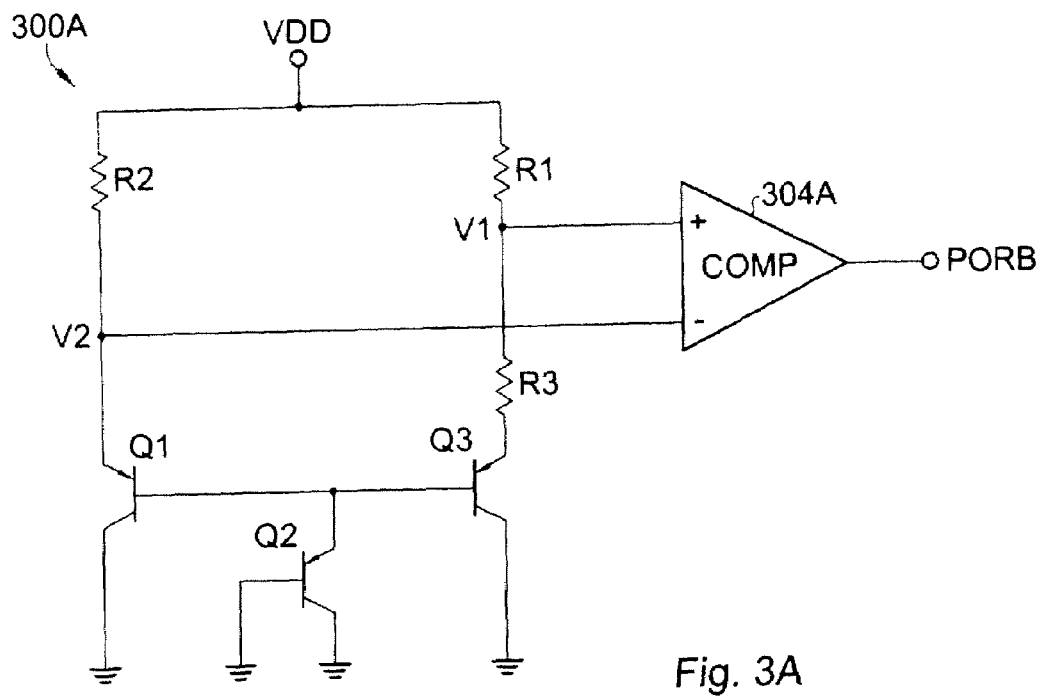
FIG. 3A is a schematic diagram of a power-on reset circuit according to a first embodiment of the present invention.

Referring now to FIG. 3A, a schematic diagram is shown of the power-on reset circuit 300A according to a first embodiment of the present invention. Operational amplifier 204 from prior art FIG. 2 is replaced by a fast comparator 304A, and the "top nodes" of resistors R1 and R2 (which were previously coupled to the reference voltage Vref at the output of operational amplifier 204 in the bandgap reference circuit 200 in FIG. 2) are now tied to the power supply voltage VDD.

Power-on reset circuit 300A includes a first PNP transistor Q1 having an emitter, a base, and a collector coupled to ground; a second transistor Q2 having an emitter coupled to the base of the first transistor, and a base and collector coupled to ground; a third transistor Q3 having an emitter, a base coupled to the base of the first transistor, and a collector coupled to ground; a first resistor R1 coupled between the VDD power supply and an internal node; a second resistor R2 coupled between VDD and the emitter of the first transistor; a third resistor R3 coupled between the internal node and the emitter of the third transistor; and a comparator 304A having a positive input coupled to the internal node and a negative input coupled to the emitter of the first transistor for generating a power-on reset signal PORB.

Figure 3B:
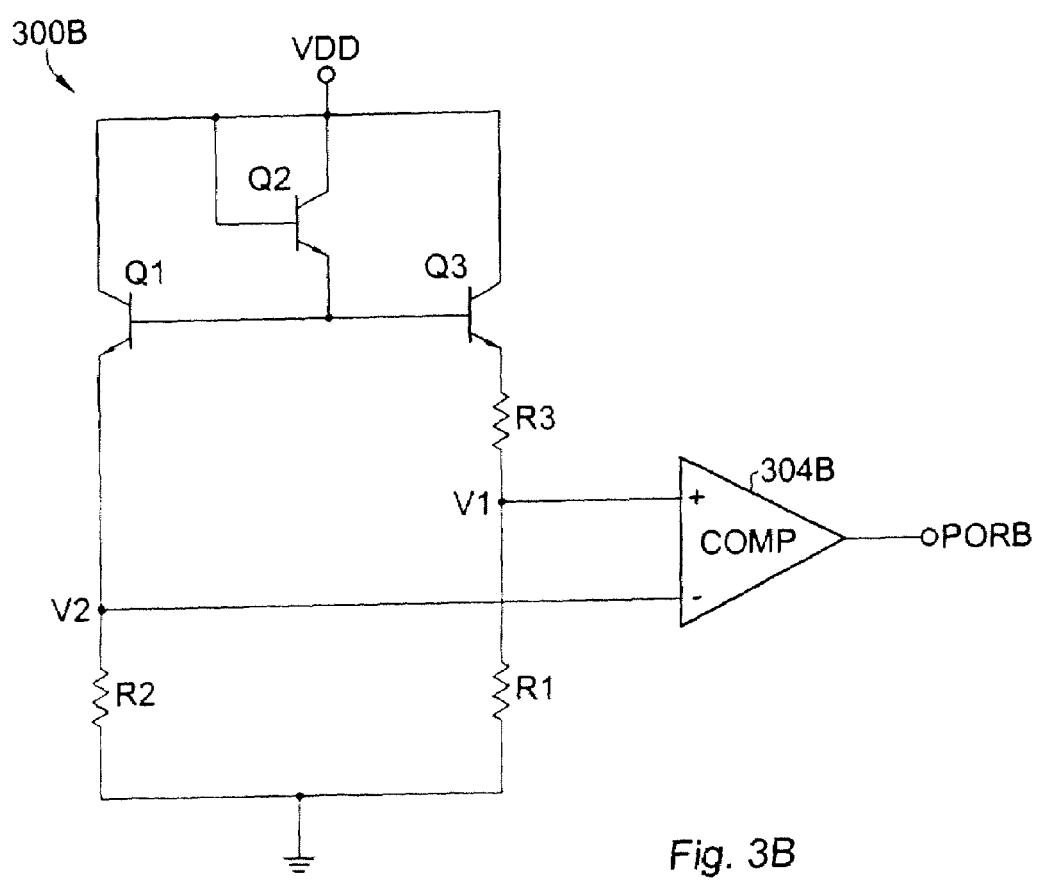
FIG. 3B is a schematic diagram of a second embodiment of the present invention.

Referring now to FIG. 3B, a second embodiment of the power-on reset circuit is shown according to the present invention. Power-on reset circuit 300B includes a first NPN transistor Q1 having an emitter, a base, and a collector coupled to VDD; a second transistor Q2 having an emitter coupled to the base of the first transistor, and a base and collector coupled to VDD; a third transistor Q3 having an emitter, a base coupled to the base of the first transistor, and a collector coupled to VDD; a first resistor R1 coupled between ground and an internal node; a second resistor R2 coupled between ground and the emitter of the first transistor; a third resistor R3 coupled between the internal node and the emitter of the third transistor; and a comparator 304B having a positive input coupled to the internal node and a negative input coupled to the emitter of the first transistor for generating a power-on reset signal PORB.

In circuit 300A shown in FIG. 3A, PNP diode-connected transistor Q2 can be replaced by an actual diode device, if available on the process used. Similarly, in circuit 300B shown in FIG. 3B, NPN diode-connected transistor Q2 can be replaced by an actual diode device, if available on the process used.

Figure 4:
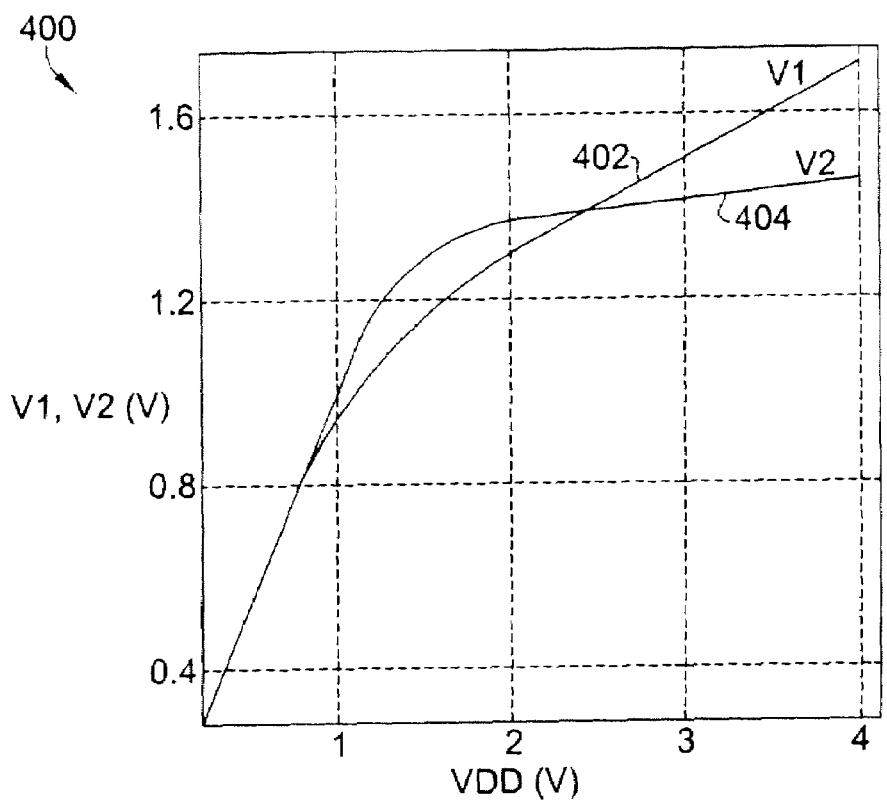
FIG. 4 is a graph of voltages V1 and V2 from FIG. 3A as functions of the VDD power supply voltage.

FIG. 4 shows voltages V1 (curve 402) and V2 (curve 404) during power-up. The horizontal axis of graph 400 represents the power supply voltage VDD and the vertical axis of graph 400 indicates the voltages V1 and V2. When VDD is low, V2 is higher than V1. The comparator COMP outputs a logic zero. When the VDD power supply increases and reaches two times the bandgap voltage of about 2.4V, voltage V1 crosses V2 and the comparator 304A switches its output PORB from a logic zero to a logic one (VDD). In this way, the trip-point of circuit 300A is set at two times the bandgap voltage. Thus, the trip-point has the same small temperature dependence as the bandgap reference. But the circuit achieves a fast response due to the replacement of the operational amplifier 204 with a fast comparator 304A.

Figure 5:
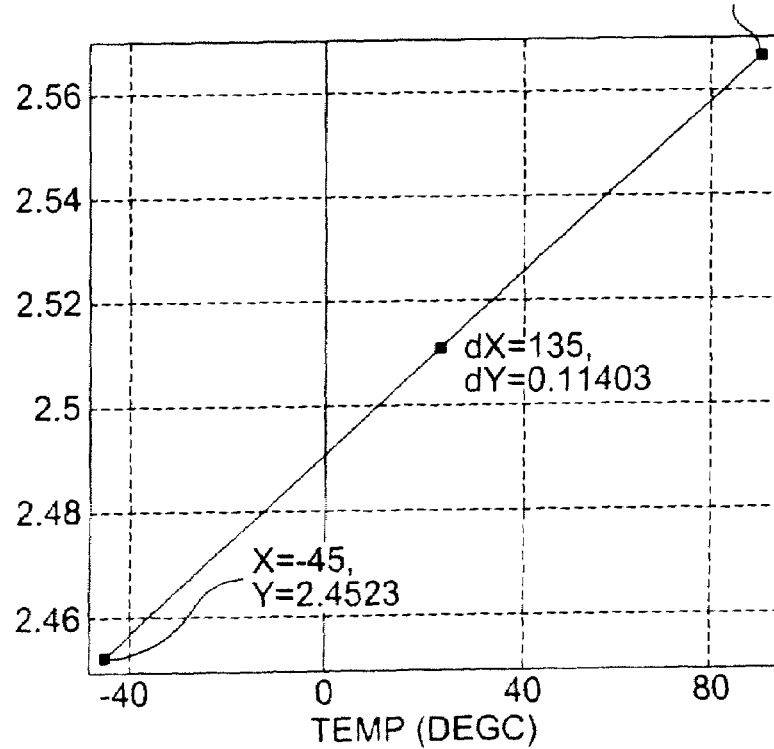
FIG. 5 is a plot of the trip-point of the power-on reset circuit versus temperature according to the present invention.

Similar to the bandgap reference explained above, the trip-point of the power-on circuit 300A of the present invention is a function of process and temperature. FIG. 5 shows the trip-point of the power-on reset circuit at −45, 25, and 90° C. with all of the process corners. The maximum variation shown in graph 500 of FIG. 5 is 2.5 volts, ±60 mV.

Figure 6:
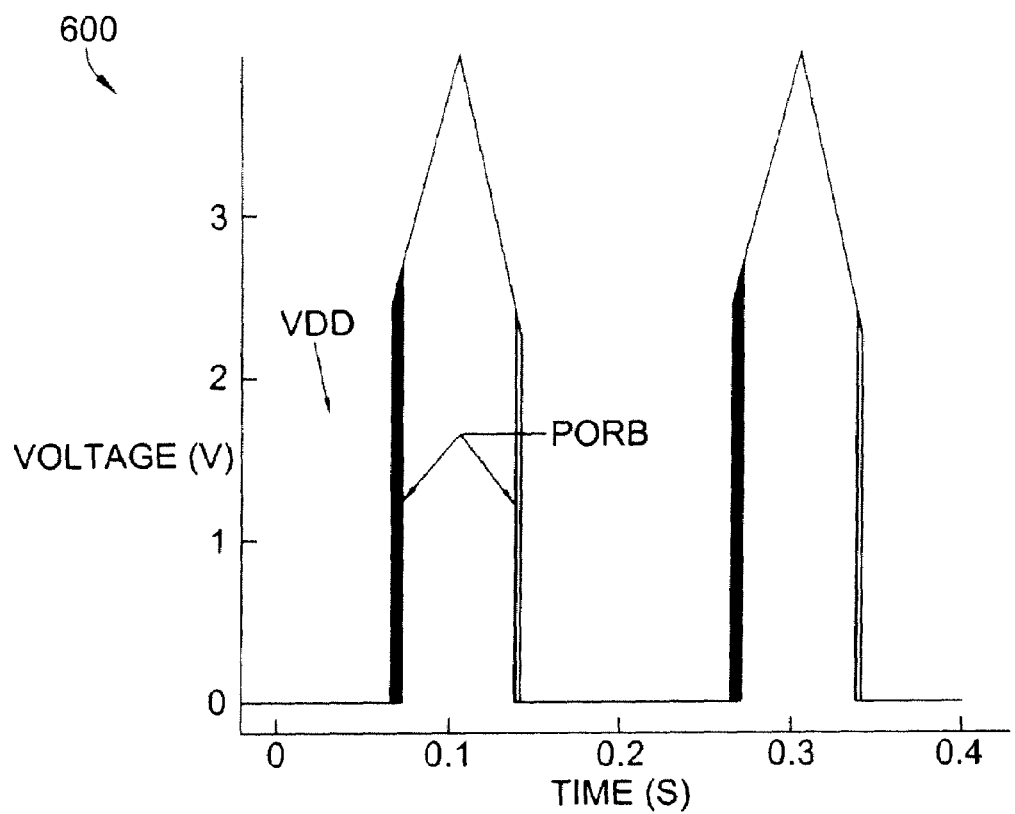
FIG. 6 is a plot of trip behavior of the circuit of the present invention at temperature and process corners for slow power-up and slow power-down conditions.
Figure 7:
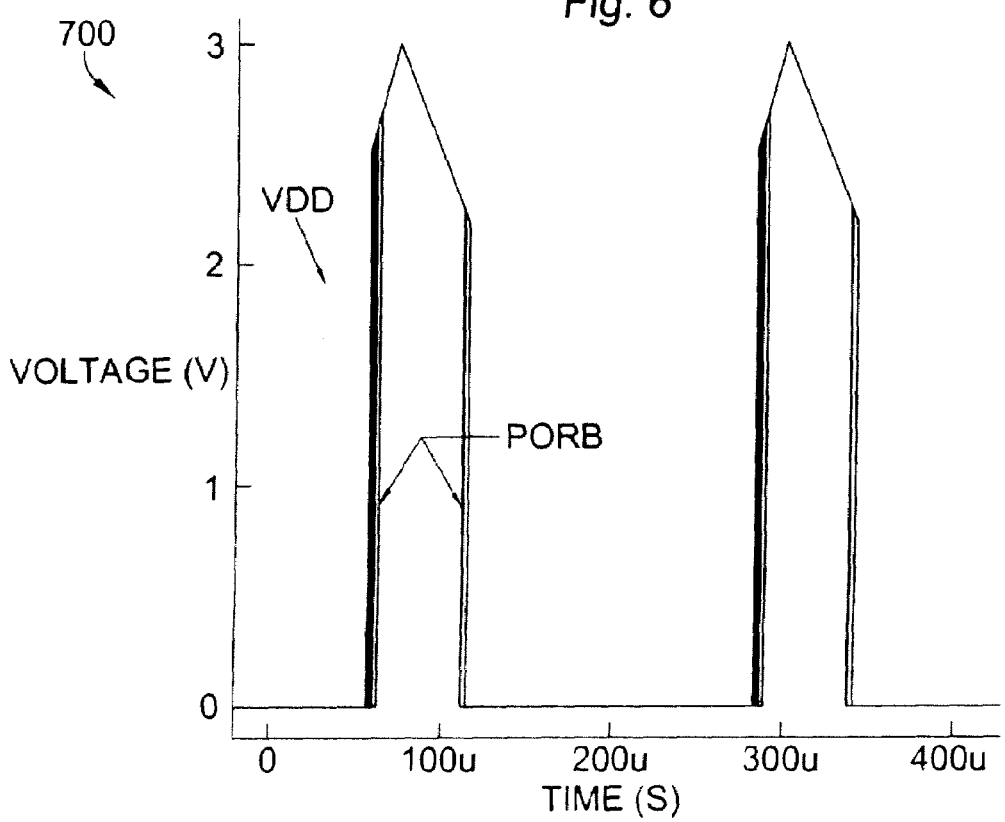
FIG. 7 is a plot of trip behavior of the circuit of the present invention at temperature and process corners for fast power-up and fast power-down conditions.

FIGS. 6 and 7 show the trip behavior of the circuit at temperature and process corners for slow (FIG. 6) and fast (FIG. 7) power-up and power-down conditions. In FIG. 6, timing diagram 600 shows the PORB signal in response to two VDD power cycles over a time scale of about 0.4 seconds. In each figure, there are a plurality of vertical lines each corresponding to a corner of temperature and process. At the scale shown in FIGS. 6 and 7, the sum of the plurality of vertical lines resembles a thick black line because the variations in response are so small across the temperature and process corners. In FIG. 7, timing diagram 700 shows the PORB signal in response to two VDD power cycles over a time scale of about 400 microseconds.

Although any resistor values may be used to satisfy a particular application using a particular process, typical values for R1, R2, and R3 in an embodiment of the present invention are R1=2 Meg Ohm, R2=30 K Ohm, and R3=400 K Ohm.

Having described and illustrated the principle of the invention in a preferred embodiment thereof, it is appreciated by those having skill in the art that the invention can be modified in arrangement and detail without departing from such principles. Although a preferred method and circuit has been shown, the exact details of the preferred method and circuit can be changed as desired as required for a particular application. We therefore claim all modifications and variations coming within the spirit and scope of the following claims.

The invention claimed is:

1. A power-on reset circuit comprising:
    a first transistor having an emitter, a base, and a collector coupled to a first voltage source;
    a second transistor having an emitter coupled to the base of the first transistor, and a base and collector coupled to the first voltage source;
    a third transistor having an emitter, a base coupled to the base of the first transistor, and a collector coupled to the first voltage source;
    a first resistor coupled between a second voltage source and an internal node;
    a second resistor coupled between the second voltage source and the emitter of the first transistor;
    a third resistor coupled between the internal node and the emitter of the third transistor; and
    a comparator having a first input coupled to the internal node and a second input coupled to the emitter of the first transistor for generating a power-on reset signal in response to a voltage at the first input being greater than a voltage at the second input,
    wherein the second transistor is in the current path of the bases of the first and third transistors.

2. The power-on reset circuit of claim 1 wherein the first voltage source comprises VDD and the second voltage source comprises ground.

3. The power-on reset circuit of claim 1 wherein the first voltage source comprises ground and the second voltage source comprises VDD.

4. The power-on reset circuit of claim 1 wherein the first transistor comprises a PNP transistor.

5. The power-on reset circuit of claim 1 wherein the first transistor comprises an NPN transistor.

6. The power-on reset circuit of claim 1 wherein the second transistor comprises a PNP transistor.

7. The power-on reset circuit of claim 1 wherein the second transistor comprises an NPN transistor.

8. The power-on reset circuit of claim 1 wherein the third transistor comprises a PNP transistor.

9. The power-on reset circuit of claim 1 wherein the third transistor comprises an NPN transistor.

10. The power-on reset circuit of claim 1 wherein the first input of the comparator comprises a positive input.

11. The power-on reset circuit of claim 1 wherein the second input of the comparator comprises a negative input.

12. A power-on reset circuit comprising:
- a first leg having a first resistor and a first transistor for generating a first voltage;
- a second leg having a second resistor, a third resistor, and a second transistor for generating a second voltage;
- a diode-connected transistor in the current path of the bases of the first and second transistors; and
- a comparator having a first input for receiving the first voltage, a second input for receiving the second voltage, and an output for generating a power-on reset signal in response to a voltage at the first input being greater than a voltage at the second input.

13. A method of generating a power-on reset signal comprising:
- providing a first leg having a first resistor and a first transistor for generating a first voltage;
- providing a second leg having a second resistor, a third resistor, and a second transistor for generating a second voltage;
- providing a diode-connected transistor in the current path of the bases of the first and second transistors; and
- providing a comparator having a first input for receiving the first voltage, a second input for receiving the second voltage, and an output for generating the power-on reset signal in response to a voltage at the first input being greater than a voltage at the second input.

14. A power-on reset circuit comprising:
- a first transistor having an emitter, a base, and a collector coupled to a first voltage source;
- a diode coupled between the base of the first transistor and the first voltage source;
- a second transistor having an emitter, a base coupled to the base of the first transistor, and a collector coupled to the first voltage source;
- a first resistor coupled between a second voltage source and an internal node;
- a second resistor coupled between the second voltage source and the emitter of the first transistor;
- a third resistor coupled between the internal node and the emitter of the second transistor; and
- a comparator having a first input coupled to the internal node and a second input coupled to the emitter of the first transistor for generating a power-on reset signal in response to a voltage at the first input being greater than a voltage at the second input, wherein the diode is in the current path of the bases of the first and second transistors.

15. The power-on reset circuit of claim 14 wherein the first voltage source comprises VDD and the second voltage source comprises ground.

16. The power-on reset circuit of claim 14 wherein the first voltage source comprises ground and the second voltage source comprises VDD.

17. The power-on reset circuit of claim 14 wherein the first transistor comprises a PNP transistor.

18. The power-on reset circuit of claim 14 wherein the first transistor comprises an NPN transistor.

19. The power-on reset circuit of claim 14 wherein the second transistor comprises a PNP transistor.

20. The power-on reset circuit of claim 14 wherein the second transistor comprises an NPN transistor.

* * * * *